(12) United States Patent
Fu et al.

(10) Patent No.: US 11,363,671 B2
(45) Date of Patent: Jun. 14, 2022

(54) CONTROLLING MIGRATION OF A QUIC CONNECTION

(71) Applicant: Telefonaktiebolaget LM Ericsson (publ), Stockholm (SE)

(72) Inventors: Zhang Fu, Stockholm (SE); András Zahemszky, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 16/966,450

(22) PCT Filed: Jan. 30, 2018

(86) PCT No.: PCT/SE2018/050065
§ 371 (c)(1),
(2) Date: Jul. 30, 2020

(87) PCT Pub. No.: WO2019/151909
PCT Pub. Date: Aug. 8, 2019

(65) Prior Publication Data
US 2021/0045186 A1    Feb. 11, 2021

(51) Int. Cl.
*H04W 80/06*    (2009.01)
*H04L 9/32*    (2006.01)
(Continued)

(52) U.S. Cl.
CPC ........... *H04W 80/06* (2013.01); *H04L 9/3213* (2013.01); *H04L 61/10* (2013.01);
(Continued)

(58) Field of Classification Search
CPC ......... H04L 45/28; H04L 63/02; H04L 67/04; H04L 67/10; H04L 29/06; H04L 12/803; G06F 9/46; G06N 5/04; H04W 36/00
See application file for complete search history.

(56) References Cited

U.S. PATENT DOCUMENTS

| | | | | |
|---|---|---|---|---|
| 10,476,800 | B2 * | 11/2019 | Shiell | H04L 69/161 |
| 10,536,561 | B2 * | 1/2020 | Pfister | H04L 67/327 |
| 11,128,562 | B2 * | 9/2021 | Araujo | H04L 45/7453 |

OTHER PUBLICATIONS

International Search Report and Written Opinion for International Application No. PCT/SE2018/050065, dated Jul. 5, 2018, 11 pages.
(Continued)

*Primary Examiner* — Iqbal Zaidi
(74) *Attorney, Agent, or Firm* — NDWE LLP

(57) ABSTRACT

Method and apparatus for controlling migration of a Quick User Datagram Protocol (UDP) Internet Connections (QUIC) connection between a server and a neighboring server of a content delivery network (CDN). The server and the neighboring server comprise respective cache memories, are comprised in the CDN and have a same server IP-address. The QUIC connection is identifiable by a connection identifier (CID) and is established to a migrating wireless device having a client IP-address. The method for controlling migration of the QUIC connection comprises receiving static key information representative of the QUIC connection; determining context transfer state information for the QUIC connection; and controlling transmission of a stateless reset token for the QUIC connection based on the determined context transfer state.

12 Claims, 9 Drawing Sheets

(51) Int. Cl.
  *H04L 61/10* (2022.01)
  *H04L 9/40* (2022.01)
(52) U.S. Cl.
  CPC ........ *H04L 63/0428* (2013.01); *H04L 63/062* (2013.01); *H04L 2209/80* (2013.01)

(56) References Cited

OTHER PUBLICATIONS

Iyengar et al., "QUIC: A UDP-Based Multiplexed and Secure Transport, draft-ietf-quic-transport-06," Sep. 22, 2017, 80 pages, Internet-Draft, IETF Trust and the persons identified as the document authors.
Iyengar et al., "QUIC: A UDP-Based Multiplexed and Secure Transport, draft-ietf-quic-transport-09," Jan. 28, 2018, 97 pages, Internet-Draft, IETF Trust and the persons identified as the document authors.
"Stateless Reset," Jun. 2017, 13 pages, QUIC Interim, Paris.
Langley et al., "QUIC Crypto," Dec. 6, 2016, 14 pages.
Iyengar et al., "QUIC: A UDP-Based Multiplexed and Secure Transport, draft-ietf-quic-transport-07," Oct. 13, 2017, 82 pages, Internet-Draft, IETF Trust and the persons identified as the document authors.
International Preliminary Report on Patentability for Application No. PCT/SE2018/050065, dated Aug. 13, 2020, 9 pages.

* cited by examiner

| flag | CID | Packet Number | Random Octets | Stateless Reset Token |
|------|-----|---------------|---------------|----------------------|

CONTROLLING MIGRATION OF A QUIC CONNECTION

CROSS-REFERENCE TO RELATED APPLICATIONS

This application is a National stage of International Application No. PCT/SE2018/050065, filed Jan. 30, 2018, which is hereby incorporated by reference.

TECHNICAL FIELD

The present disclosure relates to methods and arrangements for controlling migration of a Quick User Datagram Protocol, UDP, Internet Connections, QUIC, connection between a server and a neighboring server of a content delivery network, CDN.

BACKGROUND

Universal Mobile Telecommunication System (UMTS), Long Term Evolution (LTE), and 5G, are examples of technologies for realizing high-speed packet-based communication in wireless communication systems. The Universal Terrestrial Radio Access Network (UTRAN) is the radio access network of a UMTS, Evolved UTRAN (E-UTRAN) is the radio access network of an LTE system, and New Radio (NR) the radio access network of 5G. In an UTRAN, E-UTRAN or NR, a wireless device, e.g., a User Equipment (UE) is wirelessly connected to an access node, also generally known as a base station (BS), or more specifically as a NodeB, eNodeB or gNodeB. The access node is in turn connected to an Evolved Packet Core (EPC) that connects to external networks, e.g., to the Internet.

NR is developed to support multiple and substantially different use cases for maximum flexibility, including IoT (Internet of Things), vehicle-to-vehicle communications, assisting industrial robots, high quality media delivery as a few examples. From an operator perspective, an important use case is a mobile broadband offering. A large portion of the mobile broadband traffic can typically be cached, using a so called content delivery network (CDN), a system of distributed content delivery servers that deliver pages and other content to a user based on the geographic location of the user, the origin of the webpage and the content delivery server. In an EPC deployment, such content delivery servers may reside in a central site with other EPC components. CDNs work on the principle that once a piece of content has been generated, it does not need to be generated again for a while so a copy can be kept in a cache for quick delivery. Cache machines are optimized to serve small files with low latency.

FIG. 1a discloses a network scenario comprising a CDN and a radio access network, wherein Local site A and Local site B are each connected to respective base station sites, A and B. Base Station A (BS-A) is connected via Local site A to a central site. Base Station B (BS-B) is connected via Local site B to the same central site. Assuming a CDN scenario, the same services are provided in Local site A as in Local site B, e.g., CDN caches (Cache-A and Cache-B, respectively). In such a scenario, a wireless device 10 will have access to Cache-A when connected to Local site A via BS-A. When instead connected to Local site B via an attachment to BS-B, the wireless device will have access to Cache-B, but receiving the same content as from Cache-A. Thus, an optimal routing may be maintained, providing for a minimized latency and network bandwidth consumption.

Further improvements with regard to latency and network bandwidth consumption may be achieved by using QUIC (Quick User Datagram Protocol (UDP) Internet Connection) as a transport layer network protocol. QUIC was developed to improve perceived performance of connection-oriented web applications, addressing performance requirements of mobile and web applications. QUIC supports a set of multiplexed connections between two endpoints over User Datagram Protocol (UDP).

In QUIC, each connection is identified with a unique connection identifier, CID. The CID does not specifically reference the source and destination address, or port numbers for the connection, so even if, e.g., the IP address changes, the connection may be maintained. All QUIC packets, i.e., QUIC connections, are encrypted and authenticated. Every incoming packet is checked and validated with the CID and the corresponding credentials. If the CID is unknown, the connection is closed; but if the CID is deemed to be valid, the connection is continued even if the wireless devices have been relocated to access a new access node.

When closing the QUIC connection, a special procedure called Stateless Reset may be used by the server to close the connection to the client using a stateless reset packet. An important part of this packet is the stateless reset token that is generated by the server and given to the client during connection establishment. Using this token, the client may verify the stateless reset packet as valid.

Turning back to the scenario of FIG. 1a, Cache-A and Cache-B have the same IP address, according to an anycast paradigm. As illustrated by the arrow, the wireless device may move from an area of BS-A to the area of BS-B implying handover from BS-A to BS-B. The device continues to send packets which will reach Cache-B, but Cache-B does not have a state for the connection, i.e., the QUIC connection, and cannot recognize the packet.

When not recognizing the packet, the server, i.e., Cache-B, closes the connection in a special procedure called a stateless reset. A stateless reset packet will be generated and sent to the device as part of the procedure.

The stateless reset packet comprises a flag, the CID, a packet number, random octets and a stateless reset token. In the context of reestablishing a connection, the stateless reset token is an important part of the packet according to typical embodiments. The token can be a hash message authentication code (HMAC) with a static key that can be used across all connections to the same server. Additionally, the HMAC involves a concatenation of the server identification (ID) and CID. The stateless reset token is generated by the server and given to the client, i.e., the wireless device of FIG. 1a, during connection establishment. In the scenario of FIG. 1a, the connection is established when the wireless device is attached to BS-A and Cache-A generates and gives the stateless reset token to the client when the connection is established. Using this token, a client, here the wireless device, is capable of verifying the stateless reset packet when received from Cache-A.

Turning to the scenario where the wireless device has moved from BS-A to BS-B and needs to reestablish the connection with Cache-B instead of Cache-A, a problem may arise. When a stateless reset token is generated by Cache-A when establishing the connection, a stateless reset packet sent from Cache-B may be perceived invalid for the QUIC connection if Cache-A and Cache-B do not share the same function to generate the stateless reset packets. The wireless device will then continue to send packets for the QUIC connection until there is a timeout. At that point, a connection will be reset, i.e., reestablished, with Cache-B. This reestablishment may take a long time and therefore the user experience is negatively impacted.

The present disclosure addresses the above presented efficiency problem, whereby delivery in a CDN configuration may be negatively impacted when using the transportation protocol QUIC.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above-identified deficiencies in the art or other disadvantages.

According to a first aspect, this object is achieved by a method of a server for controlling migration of a Quick User Datagram Protocol, UDP, Internet Connections, QUIC, connection between the server and a neighboring server. The QUIC connection is identifiable by a connection identifier, CID, and is established to a migrating wireless device having a client IP-address. The server and the neighboring server comprise respective cache memories, are comprised in a content delivery network, CDN, and have a same server IP-address. The method comprises receiving static key information representative of the QUIC connection. The method further comprises determining context transfer state information for the QUIC connection and controlling transmission of a stateless reset token for the QUIC connection based on the determined context transfer state.

According to embodiments of the disclosure, the receiving of static key information comprises one of receiving information on a default hash function to be used to generate the stateless reset token, receiving a stateless reset token generating function, or receiving program code or a hash function.

According to embodiments of the disclosure, the determining of context transfer state information comprises receipt of context transfer state information from a monitoring function of a neighboring server.

According to embodiments of the disclosure, the determining of context transfer state information for the QUIC connection comprises capturing, in a monitoring function of the server, one or more encrypted data packets transmitted between the client IP-address and the server IP-address, checking packet header of the captured on more encrypted data packets, and determining a connection state and a tuple for the QUIC connection based on information from the packet header, the tuple comprising the CID, the client IP-address and the server IP-address.

According to a second aspect, the object is achieved by a computer program product comprising a non-transitory computer readable medium, having thereon a computer program comprising program instructions. The computer program is loadable into data processing circuitry and configured to cause execution of the method according to the first aspect when the computer program is run by the data processing circuitry.

According to a third aspect, the object is achieved by a method for controlling migration of a Quick User Datagram Protocol, UDP, Internet Connections, QUIC, connection between a server and a neighboring server, wherein the QUIC connection is identifiable by a connection identifier, CID, and is established to a migrating wireless device having a client IP-address. The server and the neighboring server comprise respective cache memories, are comprised in a content delivery network, CDN, and have a same server IP-address. The arrangement comprise processing circuitry configured to cause receipt of static key information representative of the QUIC connection, determining of a context transfer state information for the QUIC; and control of transmission of a stateless reset token for the QUIC connection based on the determined context transfer state.

According to a fourth aspect, the object is achieved by a host computer comprising the arrangement according to the third aspect.

According to a fifth aspect, this object is achieved by a method of a management server for controlling migration of a Quick User Datagram Protocol, UDP, Internet Connections, QUIC, connection between a server and a neighboring server, wherein the QUIC connection is identifiable by a connection identifier, CID, and is established to a migrating wireless device having a client IP-address. The server and the neighboring server comprise respective cache memories, are comprised in a content delivery network, CDN, and have a same server IP-address. The management server is configured to coordinate content delivery within the CDN. The method comprises determining static key information applicable for all QUIC connections providing a same cached content and sending the static key information to the server and to the neighboring server.

According to a sixth aspect, the object is achieved by a computer program product comprising a non-transitory computer readable medium, having thereon a computer program comprising program instructions. The computer program is loadable into data processing circuitry and configured to cause execution of the method according to the fifth aspect when the computer program is run by the data processing circuitry.

According to a seventh aspect, the object is achieved by an arrangement (90) for controlling migration of a Quick User Datagram Protocol, UDP, Internet Connections, QUIC, connection between a server and a neighboring server, wherein the QUIC connection is identifiable by a connection identifier, CID, and is established to a migrating wireless device having a client IP-address, wherein the server and the neighboring server comprise respective cache memories, are comprised in a content delivery network, CDN, and have a same server IP-address, and wherein the management server is configured to coordinate content delivery within the CDN, the arrangement comprising processing circuitry configured to cause determining of static key information applicable for all QUIC connections providing a same cached content; and sending of the static key information to the server and to the neighboring server.

According to an eighth aspect, the object is achieved by a host computer comprising the arrangement according to the seventh aspect.

In some embodiments, any of the above aspects may additionally have features identical with or corresponding to any of the various features as explained above for any of the other aspects.

An advantage of some embodiments is a secure and quick re-establishment of a secure QUIC connection between a client of a migrating wireless device and content delivery servers of a content delivery network; thereby minimizing the interruption to the application.

Another advantage is that the various aspects and embodiments may be implemented without violating the QUIC security principle.

BRIEF DESCRIPTION OF DRAWINGS

Further objects, features and advantages will appear from the following detailed description of embodiments, with reference being made to the accompanying drawings.

The drawings are not necessarily to scale, emphasis instead being placed upon illustrating the example embodiments.

FIG. 1b schematically provides details of the configuration of a communication chain from FIG. 1a;

DETAILED DESCRIPTION

Figure 1A:
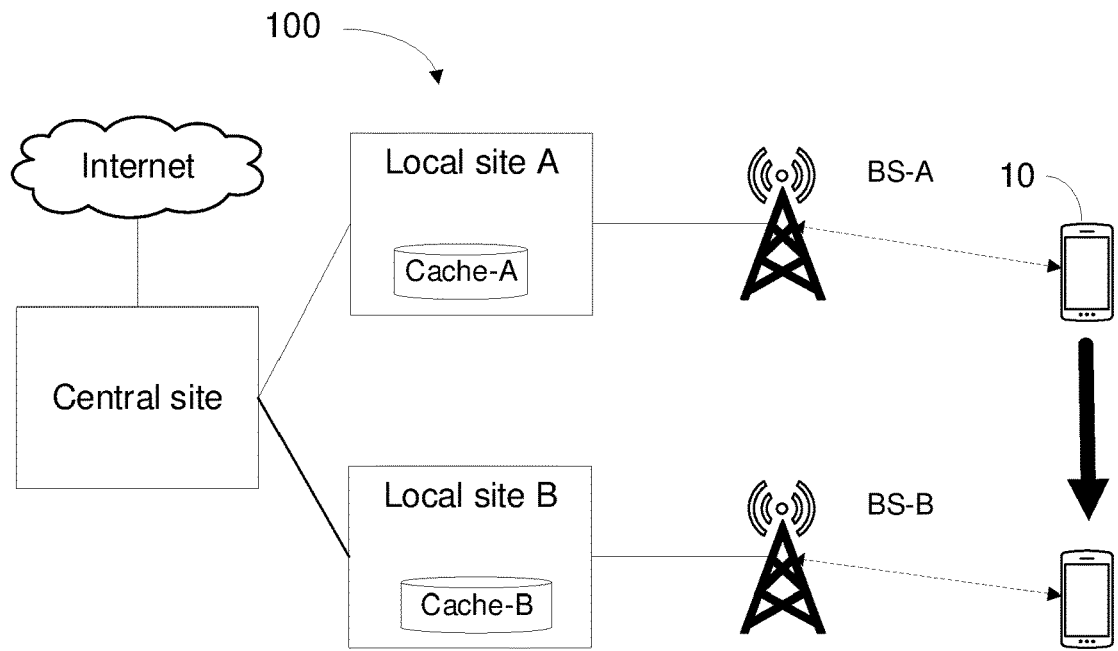
FIG. 1a schematically illustrates Content Delivery Network (CDN) and a radio access network.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. In the context of the present disclosure "comprises/comprising" is taken to specify the presence of stated features, integers, steps, or components, but does not preclude the presence or addition of one or more other features, integers, steps, components, or groups thereof.

In the following disclosure, the term wireless device will be used to refer to remote wireless equipment that are configured for wireless access to a network node, e.g., a mobile device (MD), mobile station (MS), user equipment (UE), subscriber station, remote terminal, wireless terminal, user device (such as a mobile telephone or smartphone) or a stationary device or semi-stationary device, e.g., a so called cat-M UE for Machine Type Communication (MTC) use cases or any other type of MTC device set up for MTC in a wireless network structure.

A network infrastructure component that provides wireless access to the wireless device will be referred to as an access node. Depending on the network type, other well-known terms for such a network entity are radio base station (RBS), NodeB, eNodeB, gNodeB, or access point. These terms may be used interchangeably and are used to refer to network infrastructure components that provide wireless access to wireless devices.

As disclosed in the Background section, FIG. 1a schematically illustrates a network scenario comprising a Content Delivery Network (CDN) and a radio access network. Two local sites, local site A and local site B, are each connected to a central site and to respective base station sites, BS-A and BS-B. Thus, BS-A is connected to local site A, while BS-B is connected via local site B. In a CDN application, the peer, i.e., a server, of local site A provides the same service as the peer/server of local site B, e.g., providing CDN caches. In such a scenario, a wireless device 10 receives CDN service from local site A, i.e., content from Cache-A, when it is attached via BS-A, and from local site B, i.e., content from Cache-B, when it is attached via BS-B to maintain optimal routing, thereby minimizing latency and network bandwidth consumption. The peers, i.e., servers, of local site A and local site B have the same IP address.

Figure 1B:
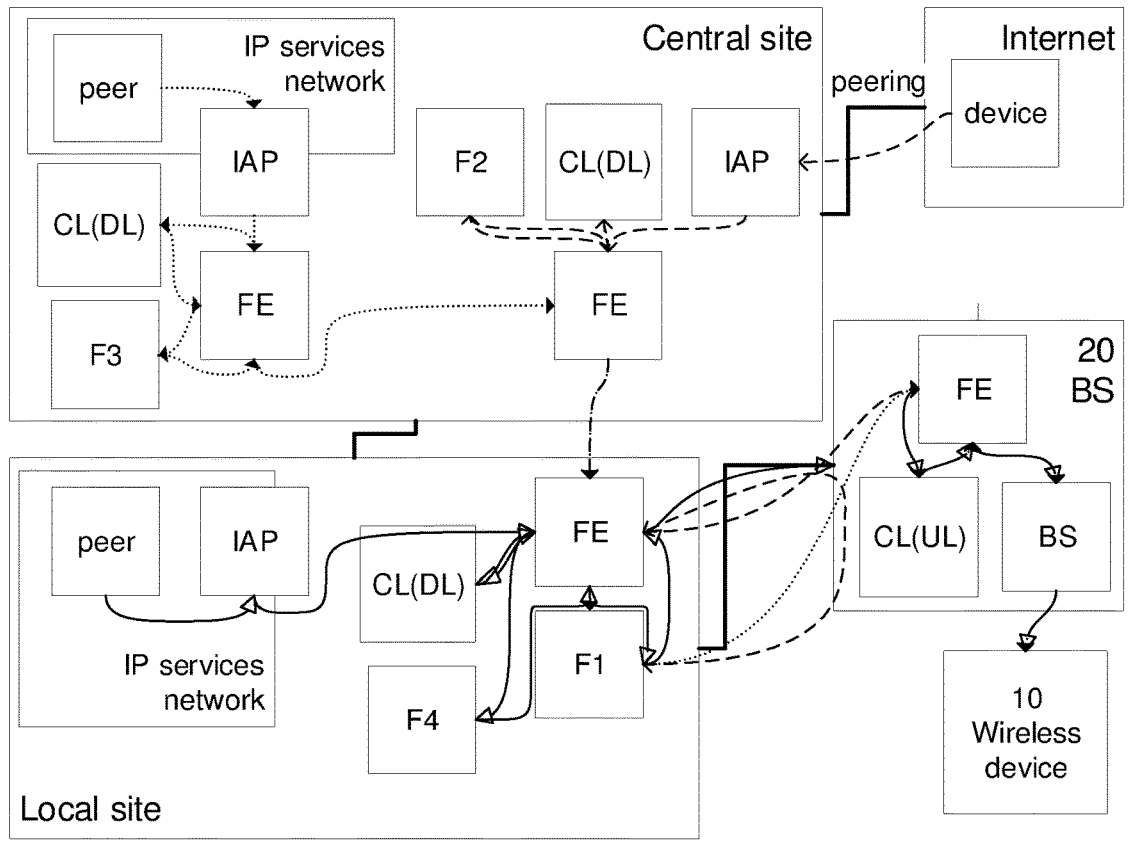

Turning to FIG. 1b an example of a CDN deployment is disclosed. The chains exemplified in FIG. 1b are simplified with regard to uplink and downlink symmetry. In the disclosed use case, one chain of functions F1-F4 is provided for traffic toward the CDN and one chain of functions F1-F2 toward the Internet. Both chains may have segment in common and functions may be spread out across the topology. As discussed with reference to FIG. 1a, it may be beneficial to perform processing in a local site or base station site in some instances and to provide the cached CDN content from a cache in the local site. Applications sensitive to latency may also be hosted within the base station site. A use case for the local site scenario is illustrated by F1-F4.

Considering User Datagram Protocol (UDP) data traffic, a Quick UDP Internet Connection (QUIC) may be used as a transport layer network protocol for a user data connection. In QUIC, each connection is identified with a unique connection identifier, CID. The CID does not specifically reference the source and destination address, or port numbers for the connection, so even if, e.g., the IP address changes, the connection may be maintained. All QUIC packets, i.e., QUIC connections, are encrypted and authenticated. Every incoming packet is checked and validated with the CID and the corresponding credentials. If the CID is unknown, the connection is closed; but if the CID is deemed to be valid, the connection is continued even when the wireless device is relocated to access a new access node.

Figures 2, 3:
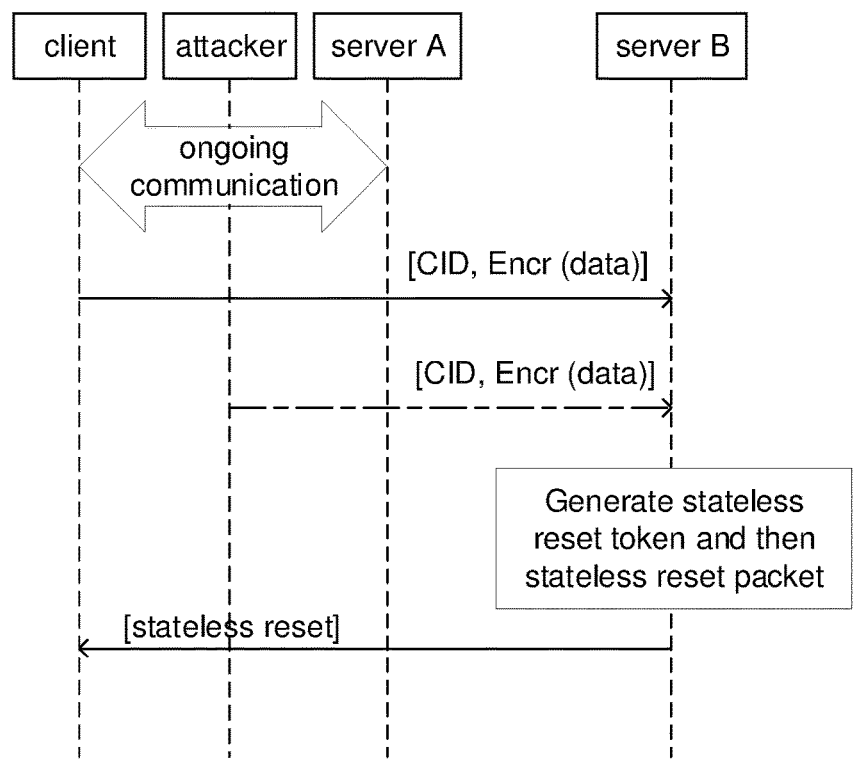
FIG. 2 schematically discloses a stateless reset packet
FIG. 3 is a signaling diagram illustrating a communication scenario with a handover and an eaves-dropper.

When closing the QUIC connection, a special procedure called Stateless Reset may be used by the server to close the connection to the client using a stateless reset packet. FIG. 2 schematically illustrates the stateless reset packet. The stateless reset packet comprises a flag, the CID, a packet number, random octets and a stateless reset token. The stateless reset token is an important part of this packet. The stateless reset token is generated by the server and given to the client, i.e., the wireless device of FIG. 1a, during connection establishment. The stateless reset token is a 128 bits value, e.g., determined as a keyed-hash message authentication code, HMAC, of the static key and a concatenation of the server ID and the connection identifier: HMAC (static key, server ID||CID). The static key is used across all connections to the same server, i.e., to the same server ID.

Turning back to the disclosure of FIG. 1a, when communicating data by means of a QUIC connection and the wireless device 10 moves from BS-A to BS-B, the wireless device continues sending packets which will reach a server of local site B, but the packets will not be recognized since no state has been established for this QUIC connection. When a connection ID is received that is unknown to local site B, the server local site B will then generate a stateless reset packet to the wireless device. Conventionally, since the stateless reset token is not generated by the server having established the QUIC connection, the receiving wireless device would determine that the packet is invalid for the QUIC connection. The wireless device will continue to send packets for the QUIC connection until reaching a timeout without receiving any ACKs from the server of local site B. Then the device will reset the connection—a procedure that slows down the connection.

In the scenario of FIG. 1a, the connection is established when the wireless device 10 is attached to BS-A. A stateless reset token is generated in a server of local site A and sent to the client when the connection is established. Using this token, a client, here the wireless device 10, is capable of verifying the stateless reset packet when received from the server. Hence, using this token, the client may verify that the stateless reset packet is valid.

In the scenario of FIG. 1a, Cache-A and Cache-B have the same IP address. As illustrated by the arrow, the wireless device may move from an area of BS-A to the area of BS-B implying handover from BS-A to BS-B. Turning to the scenario where the wireless device 10 has moved BS-A to BS-B and needs to reestablish the connection with a server of local site B instead of with a server of local site A, a problem arises in that a stateless reset packet sent from the server of local site B does not comprise the stateless reset token generated by the server of local site A when establishing the connection. Thus, the server of local site B will send a stateless reset packet with a stateless reset token that will be perceived invalid for the QUIC connection when received in the wireless device. Therefore, the wireless device will continue to send packets for the QUIC connection until there is a timeout. At that point, a connection will be reset, i.e., reestablished, with the server of local site B.

To make the cache relocation more efficient, a solution where the server of a neighboring server, i.e., the server of local site B, shares the function and static key of the original server, i.e., the server of local site A, to generate the stateless reset token is proposed. Since the neighboring server shares the server ID, i.e., IP address, with original server, a valid token can be generated for the corresponding CID. The client will then be able to reset the current connection immediately in response to receiving the stateless reset packet from the server of local site B.

However, using a solution where all caches that share same server ID, also share a function and static key for generating stateless reset packets, a security problem is identified. FIG. 3 schematically discloses a communication scenario with a handover and an eaves-dropper/attacker. In the handover situation, the client will transmit an encrypted data packet, identifiable by means of the CID. Receipt of this encrypted data packet in the server of local site B, will initiate a legitimate stateless reset procedure, i.e., generation and sending of a stateless reset packet comprising a stateless reset token as illustrated in FIG. 2. The stateless reset procedure is initiated to re-establish the connection between the client IP-address and the server IP-address. However, if an eaves-dropper/attacker is able to sniff the traffic between the client and a local CDN server, the eaves-dropper/attacker may be able to get packets for a specific connection. When server A and server B share the same stateless reset packet generation function and the same server ID, an eaves-dropper/attacker can eaves-drop the network and get packets from a first, original, server and then replay the packets to a second, neighboring server, which then sends valid stateless reset packet to the client. However, since the client is not moving, the QUIC connection should not be reset. Thus, the legitimate communication is subverted by the reset. If the attacker continues to do the attack, the client cannot communicate with the cache which leads to a denial of service.

Figure 4:
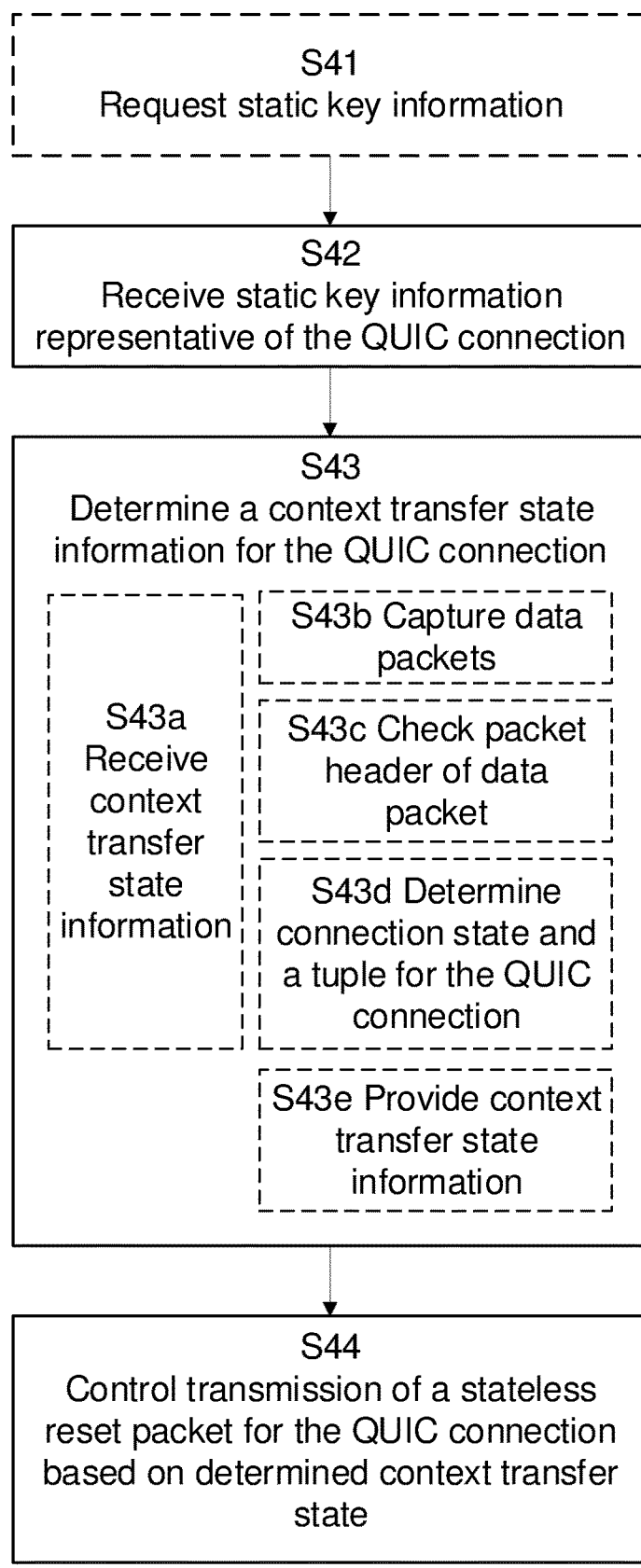
FIG. 4 is a flowchart illustrating example method steps according to some embodiments.

FIG. 4 is a flowchart illustrating example method steps according to some embodiments that overcomes the above disclosed problems and disadvantages. FIG. 4 illustrates a method performed in a server for controlling migration of a Quick UDP Internet Connections, QUIC, connection between the server and a neighboring server. Aspects of the server implementation may be arranged in a local site of a CDN and/or in a base station site, see CDN illustration of FIG. 1a. The server is configured to deliver a cached content from a cache memory. In the description, a monitoring function will be referred to as a separate function, but it should be understood that this function represents a logical function that may in fact be fully comprised within a server arranged to provide the cached content as well as comprised in a server separated from the content providing server. Accordingly, the monitoring function may also be performed along other parts of the communication path between a server providing the cached content and a client receiving the cached content, as long as an ability of monitoring traffic between a wireless device hosting the client and the server. Thus, the herein proposed monitoring function is arranged within any server environment between the content providing server and the content receiving client to enable and control re-establishing of the QUIC connection to one or more servers of corresponding second local sites.

FIG. 4 discloses method steps performed for controlling migration of a Quick UDP Internet Connections, QUIC, connection, i.e., to control re-establishing of the QUIC connection following migration to a neighboring server in a content delivery network, CDN. The QUIC connection is identifiable by a connection identifier, CID, and is established to a migrating wireless device having a client IP-address, e.g., a QUIC connection to a server of a local site A as illustrated in FIG. 1a. The server and the neighboring server of the CDN comprise respective cache memories, are comprised in a content delivery network, CDN, and have a same server IP-address. As mentioned, the QUIC connection is identifiable by a connection identifier, CID. In its most general form, the method comprises receiving S42 static key information representative of the QUIC connection, determining S43 context transfer state information for the QUIC connection in a monitoring function of the server and controlling S44 transmission of a stateless reset token for the QUIC connection based on the determined context transfer state. According to some embodiments, the server sends S41 a request for static key information to a management server and receives S42 the static key information in response to this request.

Thus, the server is capable of controlling migration of the QUIC connection by monitoring data packets communicated between the client IP address and the server IP-address to thereby assist the secure-re-establishing of the QUIC connection by providing selected information to neighboring servers. The monitoring function is arranged in an interface between the server and the client, thereby enabling a traffic monitoring function.

According to some embodiments, the determining of context transfer state comprises receiving S43a context transfer state information from a monitoring function of a neighboring server. The context move may be initiated in response to a handover event where the migrating wireless devices moves from a server base station to a neighboring base station, thereby evoking the need to move the QUIC connection from the server to the neighboring server. The monitoring function of the server having the established QUIC connection will transfer the connection information to a monitoring function of the neighboring server, i.e., through direct signaling between the two monitoring functions or by providing the determined context transfer state information to the management server from the releasing server, whereupon the management server is configured to forward the information to the monitoring function of the neighboring base station.

According to some embodiments, the server captures S43b one or more encrypted data packets transmitted between the client IP-address and the server IP-address, e.g., corresponding to a procedure of a proxy server. Having access to the captured data packets, the server checks S43c packet header of the captured one or more encrypted data packets and determines S43d a connection state and a tuple for the QUIC connection based on information from the packet header, the tuple comprising the CID, the client IP-address and the server IP-address.

According to embodiments, the connection state and tuple is representative of the connection to the server IP-address, the IP-address being the same for the first local CDN server and the one or more other local CDN servers. The present disclosure is particularly advantageous for secure and quick re-establishment of a secure QUIC connection between a client of a migrating wireless device and content delivery servers. Turning back to FIG. 1a, local site A and local site B comprise respective servers that provide Cache-A and Cache-B having the same IP-address; a typical scenario for a CDN.

According to some embodiments, the static key information representative of the QUIC connection may be provided to the server according to a number of alternatives.

As a first option, information may be provided on a default hash function to be used to generate the stateless reset token. A management server may inform the server to use a default hash function (e.g., MD5) which is preconfigured to the local CDN server, e.g., in response to a request for information sent from the server to the management server.

As a second option, information may be provided regarding a generating function, e.g., as a name of a generating function. The management server may provide a function name (e.g., SHA1, SHA2, MD5) to the local server, e.g., in response to a request for static key information sent from the server to the management server. The server, receiving the static key information from the management server will use the function, e.g., to generate the stateless reset token when hash functions have been pre-installed in the server.

As a third option, program code may be provided to the server. The management server directly gives the program code of a hash function to the server, e.g., in response to a request for information sent from the server to the management server. The server installs the hash function and uses it to generate, e.g., the stateless reset token.

According to some embodiments, a plurality of other local CDN servers each has a same server IP-address and a request for static key information sent from one server to the management server may result in the management server providing static key in formation to a plurality of local CDN servers in response to the request, e.g., to all local CDN servers having a same IP address. While the QUIC connection may have been established between a first local CDN server and a client of a wireless device, the procedure for enabling a re-established connection may involve a plurality of local CDN servers associated with adjacent access points. The QUIC connection may also be a multipath connection deploying two or more frequencies, implying that the re-establishing in fact requires re-establishing of a plurality of connection streams that may involve two or more neighboring local CDN servers.

According to some embodiments, the determining of context transfer state information for the QUIC connection comprises capturing S43a one or more encrypted data packets transmitted between the client IP address and the server IP-address, checking S43b packet header of the captured one or more encrypted data packets; and determining S43c a connection state and a tuple for the QUIC connection based on information from the packet header, the tuple comprising the CID, the client IP-address and the server IP-address.

According to some embodiments, when a handover happens and the wireless devices migrates to a new base station and consequently needs to re-establish the connection with a neighboring server, the server, i.e., the monitoring function of the server, provides S43e the determined context transfer state information for the QUIC connection to a corresponding monitoring function associated with the neighboring server, e.g., via the management server. Accordingly, the server determines context transfer state information applicable for the QUIC connection and controls transmission of a stateless reset token for the QUIC connection based on the determined context transfer state.

Figure 5A:
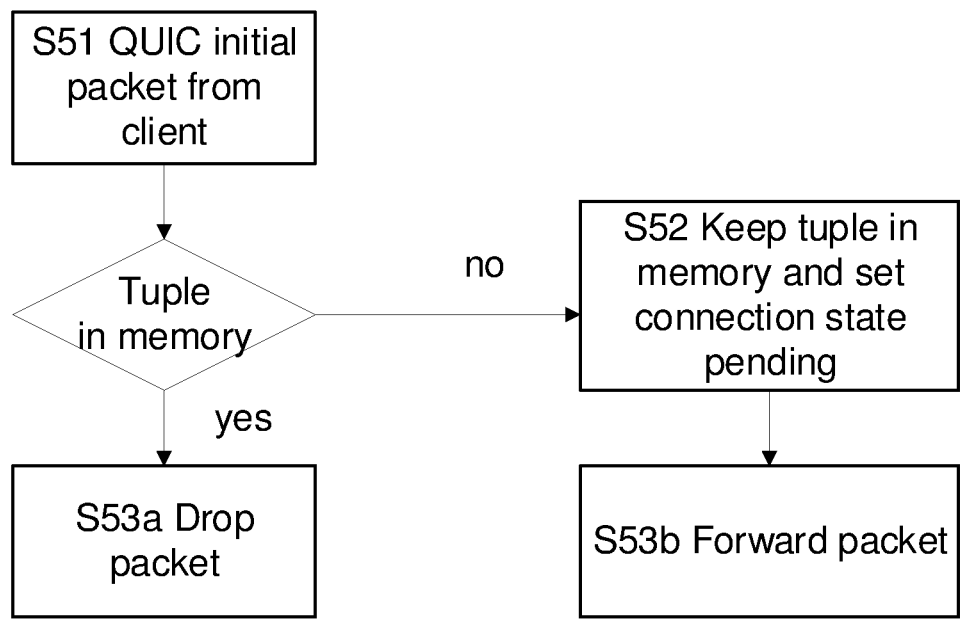
FIG. 5a is a flowchart illustrating example monitoring and controlling of QUIC traffic.
Figure 5B:
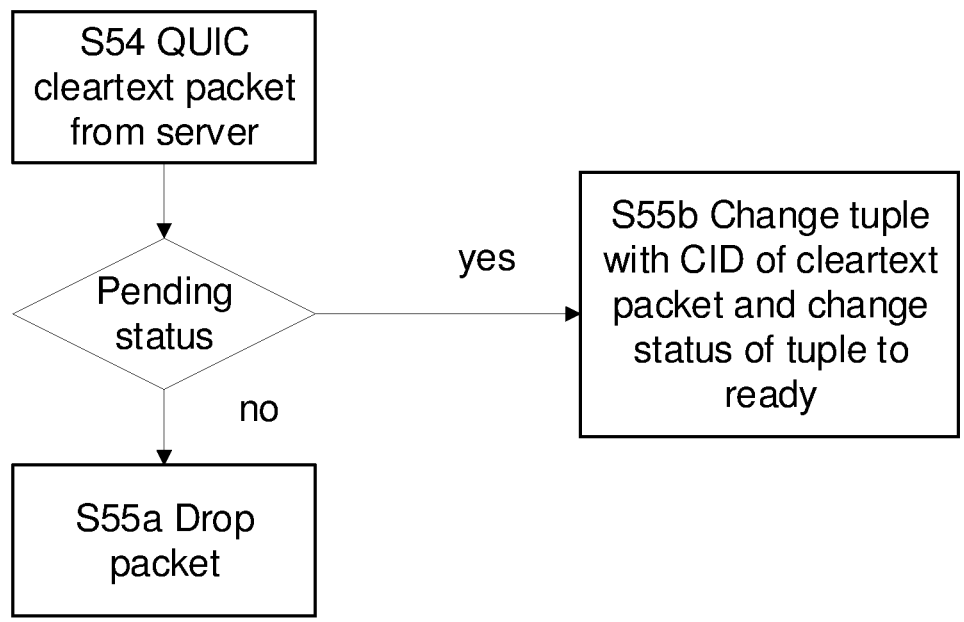
FIG. 5b is a flowchart illustrating example monitoring and controlling of QUIC traffic.
Figure 5C:
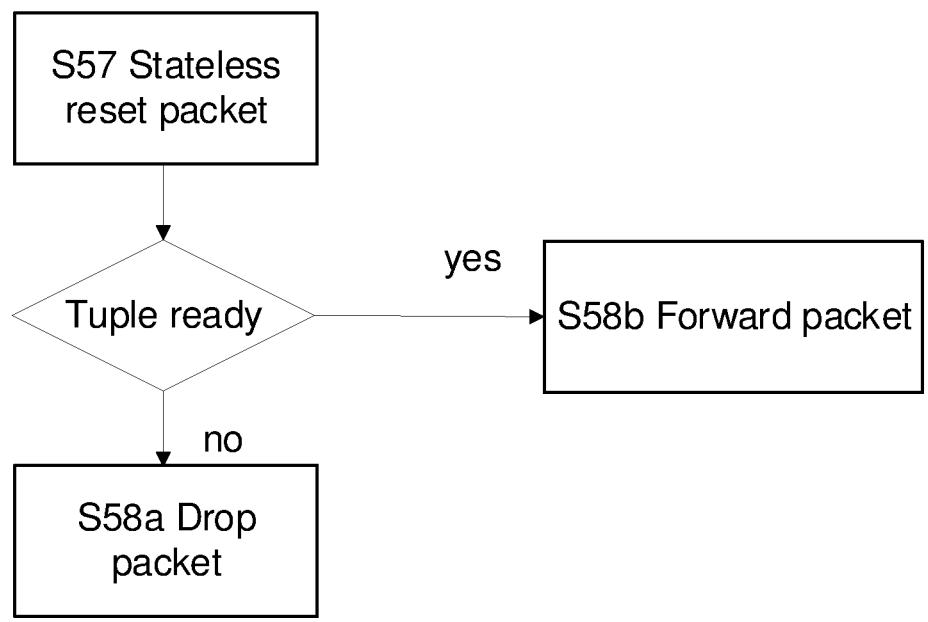
FIG. 5c is a flowchart illustrating example monitoring and controlling of QUIC traffic.

Turning to FIGS. 5a to 5c, scenarios of monitoring QUIC traffic for determining context transfer state information is disclosed, e.g., performed by a monitoring function in the determining of context transfer state information for the QUIC connection. The proposed monitoring function is deployed in servers of each local site of the CDN. The monitoring function is provided between the local CDN and the wireless device that hosts the client. The monitoring function is monitoring the traffic between the wireless device and the local CDN server and keeps the state of the active QUIC connections to the local CDN servers associated with the local site.

FIG. 5a discloses receipt in the server of a QUIC initial packet S51 from a client. If the tuple comprising (CID, client IP-address, and server IP-address is already in the memory of the server, the initial packet is dropped S53a. In the other instance, the tuple will be maintained in the memory and a connection state will be set to pending S52 for the client IP-address and server IP-address. The initial packet is forwarded S53b to a receiving server. Thus, during receipt of a QUIC initial packet setting, i.e., when establishing the QUIC connection, one or more data packets transmitted between the client IP-address and the server IP-address may be captured by a monitoring function of the server, whereupon a connection state and a tuple for the connection is determined, the tuple comprising the CID, the client IP-address and the server IP-address.

FIG. 5b discloses operation of the monitoring function when receiving a cleartext packet S54 in response to the client initial packet. The monitoring function checks status of the stored client and server IP-addresses and drops the packet S75a if the connection status is not a pending status. The monitoring function rewrites the CID in the memory S75b of the server and change status of tuple to ready. Consequently, the data packets transmitted between the server IP-address and client IP-address are captured, and a connection state and a tuple for the connection is determined and stored in the server. FIG. 5c discloses the scenario where the server receives a stateless reset packet. The monitoring function checks whether a ready tuple exist for the CID, client and server IP-address. The stateless reset packet is forwarded to a receiving client if a ready tuple exists. Otherwise, the stateless reset packet is dropped; thereby preventing an attacker from disrupting the transmission as illustrated in FIG. 3.

According to embodiments, the encrypted packets that are being communicated between the wireless device and the server goes through the monitoring function of local CDN server, e.g., being captured by the monitoring function. Thus, the monitoring function will have the state of the QUIC connection. When service relocation occurs, the original server transfers the connection information to the neighboring server; enabling forwarding of a valid stateless reset packet. Having received the context transfer state information in the neighboring server, valid stateless reset packets may be provided to the wireless device and the wireless device may reset the connection immediately to re-establish the connection with the neighboring server.

Figure 6:
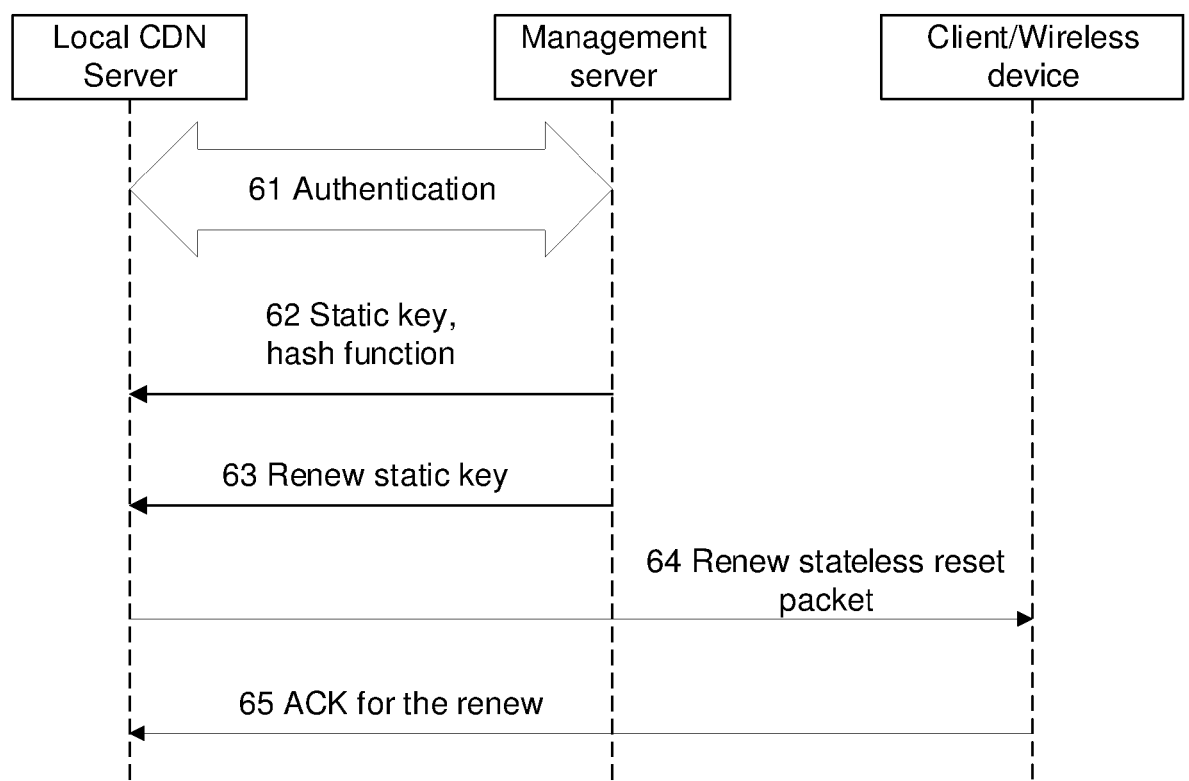
FIG. 6 is a signaling diagram illustrating example signaling according to some embodiments.

FIG. 6 discloses signaling between a client and a server, e.g., a local CDN server, when a management server has been associated with the server. Each time when a new local CDN server starts up, it first contacts the management server to obtain the static key and hash function. Initially, an authentication signaling 61 is provided between the local CDN server and the management server, i.e., the local CDN server first authenticates itself with the management server, e.g., by using a public key infrastructure, PKI. Following the authentication, the management server transmits 62 the static key and the hash function (H) to the local CDN cache. The message is encrypted with the cache private key. The management server also delivers 63 information to the local CDN server to renew the static key, e.g., as presented above. Having received the renewed static key, the local CDN server uses this information to initiate modifying the stateless reset token by transmitting 64 a renewed stateless reset token. The stateless reset token being received by the client, the client transmits 65 an ACK for the renewal.

Figure 7:
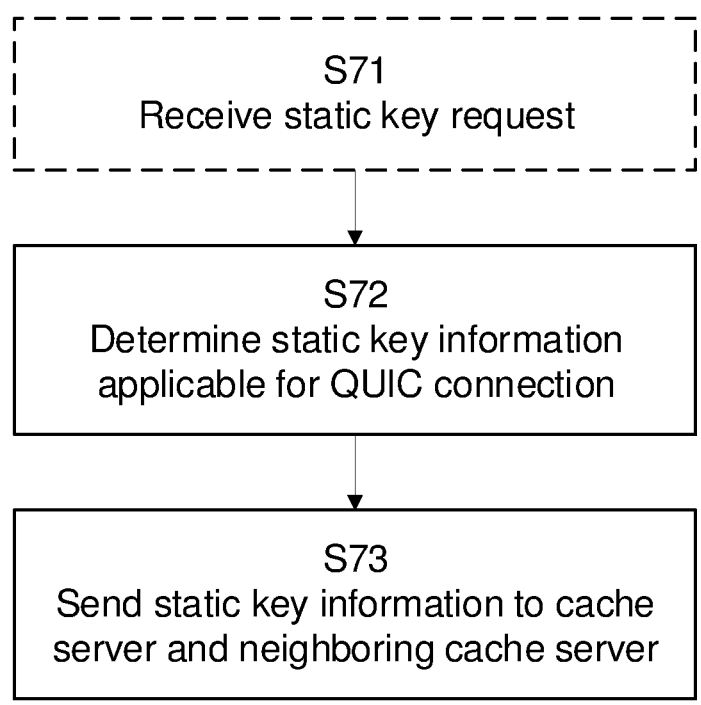
FIG. 7 is a flowchart illustrating example method steps according to some embodiments.

FIG. 7 is a flowchart illustrating example method steps according to some embodiments, i.e., a management server embodiment. FIG. 7 discloses method steps performed for controlling migration of a Quick UDP Internet Connections, QUIC, connection between an originating server and a neighboring server, wherein the originating server and the neighboring server comprise respective cache memories, are comprised in a content delivery network, CDN, and have a same server IP-address. A QUIC connection is presumably established between the originating server and a wireless device having a client IP address, e.g., as illustrated in FIG. 1a. The QUIC connection is identifiable by a connection identifier, CID. In its most general form, the method comprises determining S72 static key information applicable for the QUIC connection and sending S73 the static key information to the server and to one or more neighboring servers. The above disclosed steps may be performed in response to receiving a static key request S71, transmitted from server as illustrated in the in FIG. 4, but may also be performed independent of such a received request.

Thus, according to some embodiments, the management server receives S71 a static key request from a server and/or a neighboring server, and performs the steps of determining and sending static key information in response to this request. According to some embodiments, the management server further receives context transfer state information for the QUIC connection from a monitoring function of a server and provides the context transfer state information to a monitoring function of a neighboring server. As will be understood from the description above, the QUIC context can of course also be transferred directly from one monitoring function to its neighboring monitoring function.

According to some embodiments, the static key information may be a default hash function to be used to generate the stateless reset token in the second local CDN server. The management server will send information to one or more local CDN servers to use a default hash function (e.g., MD5) which is preconfigured in the local CDN server. As a second option, information may be a generating function, e.g., a name of a generating function. The management server may send a function name (e.g., SHA1, SHA2, MD5) to the local CDN server, which will use the function, e.g., to generate the stateless reset token when hash functions have been pre-installed in the server. As a third option, program code may be sent to the local CDN server. Thus, the management server may provide the program code of the hash function to the servers that install the hash function and use it to generate, e.g., the stateless reset token.

Thus, as disclosed with reference to FIGS. 4 to 7 above, a service function capable of monitoring and controlling the QUIC traffic is proposed so that relocation between different local CDN servers, i.e., edge cache server relocation, can be done more securely and efficiently. Turning to the scenario of FIG. 1a, the relocation procedure would be as follows: since the server of local site B share the function with the server of local site A to generate stateless reset token, and share the same server ID (IP address), it can generate a valid token for the corresponding CID. This will enable the client to reset the current connection immediately when receiving the stateless reset packet. Each time when a new server is brought into service, it first contacts the management server to get the H function, i.e., a cryptography hash function, and the static key. The server first authenticates itself with the management server using a public key infrastructure (PKI). Then the management server sends the H function and the static key to the requesting server and possibly also to other servers having the same server address. Context transfer state information is determined for packets going between the wireless device and the server of local site A in the proposed service function. This information is transferred to corresponding service function of local site B, e.g., through signaling between the two service functions. Thus, the server of local site B will be capable of generating a valid stateless reset packet and the service function will allow forwarding of the stateless reset packet to the wireless device having the state of the QUIC connection. After forwarding of the stateless reset packet, the wireless device can reset the connection immediately to the server of local site B.

Considering wireless devices and server aspects of the above disclosed implementations, the service/monitoring function will intercept traffic between the wireless device and the local CDN server, but will not have a material impact on the QUIC connections between the wireless device client and the local CDN server. When a QUIC connection is set up between the wireless device and a local CDN server, the server provides the stateless reset token to the wireless device, i.e., the stateless reset token is received by the client of the wireless device. When the wireless device receives a stateless reset packet comprising the stateless reset token, this may be resolved by the client using the stateless reset token received from the local CDN server. Consequently, when a neighboring server has received information, to enable transmission of a stateless reset packet, the wireless device will be capable of resolving the token and thereby to re-establish the QUIC connection with the second local CDN cache in a secure and efficient way.

Figure 8A:
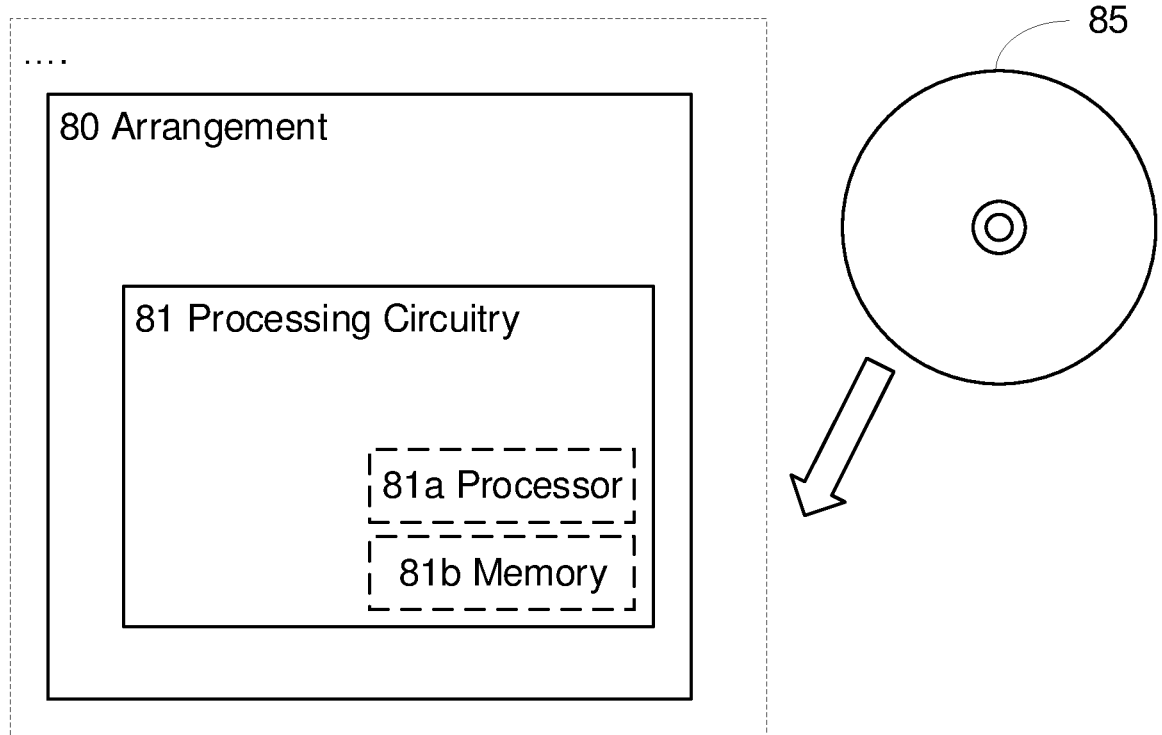
FIG. 8a is a schematic drawing of a block diagram illustrating an example arrangement and a computer readable medium according to some embodiments.

FIG. 8a is a schematic block diagram illustrating an example arrangement 80 for controlling migration of a Quick UDP Internet Connections, QUIC, connection between the server and a neighboring server, e.g., as illustrated in FIG. 1a. The server and the neighboring server comprise respective cache memories, are comprised in a content delivery network, CDN, and have a same server IP-address. The QUIC connection is identifiable by a connection identifier, CID, and is established to a migrating wireless device having a client IP-address.

FIG. 8a also illustrates an example computer program product 85 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 81, which may, for example, be comprised in a host computer of a management server. When loaded into the processing circuitry 81, the computer program may be stored in a memory 81b associated with or comprised in the processing circuitry. According to some embodiments, the computer program may, when loaded into and run by the processing circuitry, cause execution of the above described method steps.

Thus, the computer program is loadable into data processing circuitry, e.g., into the processing circuitry 81 of FIG. 8a, and is configured to control migration of a QUIC connection between a server and a neighboring server. Thus, the example arrangement of FIG. 8a may, for example, be configured to perform method steps described in connection with FIG. 4 or 5.

The arrangement comprises processing circuitry 81 configured to receive static key information representative of the QUIC connection. The processing circuitry is further configured to determine context transfer state information for the QUIC connection and to control transmission of a stateless reset token for the QUIC connection based on the determined context transfer state.

According to aspects of the disclosure, the processing circuitry comprises a processor 81a and a memory 81b. The processor 81a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in a host computer of a management server. The memory may be any suitable type of computer readable memory capable of storing instructions of a computer program and may be of volatile and/or non-volatile type.

Figure 8B:
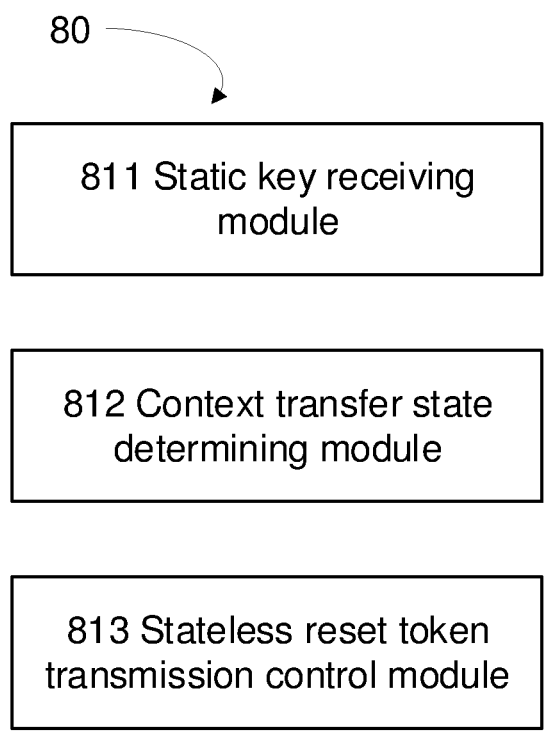
FIG. 8b is a schematic block diagram illustrating an example arrangement according to some embodiments.

FIG. 8b provides another schematic block diagram illustration of the arrangement. The arrangement comprises a static key receiving module 811 configured for receiving static key information representative of the QUIC connection. The arrangement further comprises a context transfer state determining module 812 configured to determine a context transfer state information for the QUIC connection and a stateless reset token transmission control module 813 configured to control transmission of a stateless reset token for the QUIC connection based on the determined context transfer state. The example arrangement of FIG. 8b may, for example, be configured to perform method steps described in connection with FIGS. 4 and 5.

Figure 9A:
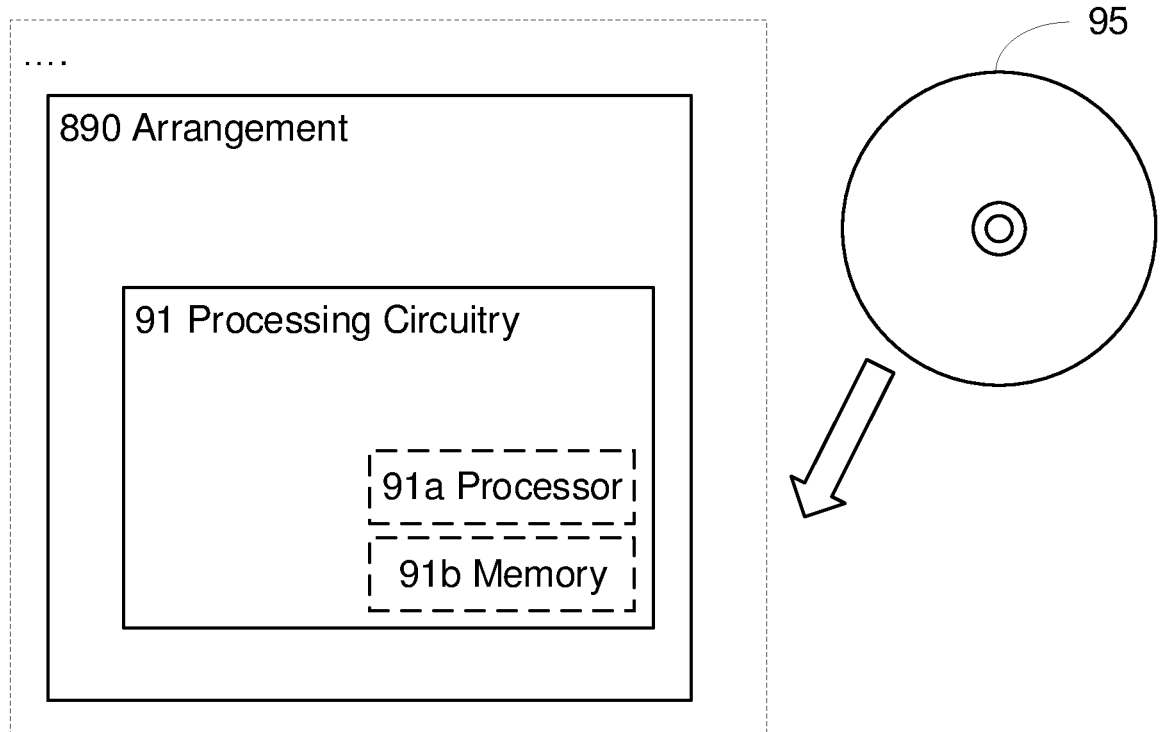
FIG. 9a is a schematic drawing of a block diagram illustrating an example arrangement and a computer readable medium according to some embodiments.

FIG. 9a is a schematic block diagram illustrating an example arrangement 90 for controlling migration of a Quick UDP Internet Connections, QUIC, connection between a server and a neighboring server. The server and the neighboring server comprise respective cache memories, are comprised in a content delivery network, CDN, and have a same server IP-address. The QUIC connection is identifiable by a connection identifier, CID, and is established to a migrating wireless device having a client IP-address.

FIG. 9a also illustrates an example computer program product 95 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 91, which may, for example, be comprised in a host computer of a management server. When loaded into the processing circuitry 81, the computer program may be stored in a memory 91b associated with or comprised in the processing circuitry. According to some embodiments, the computer program may, when loaded into and run by the processing circuitry, cause execution of the above described method steps.

Thus, the computer program is loadable into data processing circuitry, e.g., into the processing circuitry 91 of FIG. 9a, and is configured to control migration of a QUIC connection between a server and a neighboring server when the computer program is run by the processing circuitry. Thus, the example arrangement of FIG. 9a may, for example, be configured to perform method steps described in connection with FIG. 7.

The arrangement comprises processing circuitry 91 configured to determine static key information applicable for the QUIC connection. The processing circuitry is further configured to send static key information to the server and the neighboring server.

According to aspects of the disclosure, the processing circuitry comprises a processor 91a and a memory 91b. The processor 91a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in a host computer of a management server. The memory may be any suitable type of computer readable memory capable of storing instructions of a computer program and may be of volatile and/or non-volatile type.

Figure 9B:
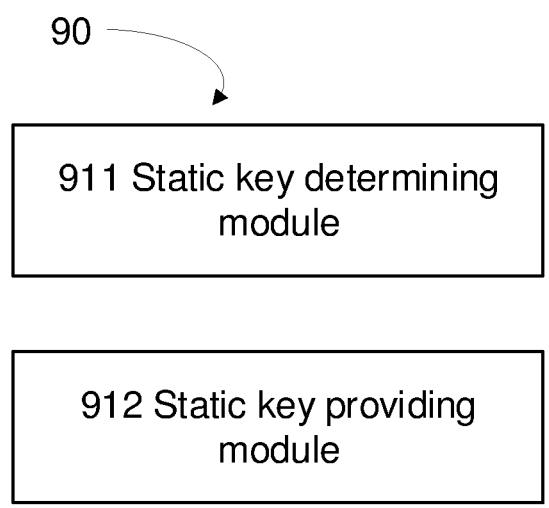
FIG. 9b is a schematic block diagram illustrating an example arrangement according to some embodiments.

FIG. 9b provides another schematic block diagram illustration of the arrangement. The arrangement comprises a static key determining module 911 configured to determine static key information applicable for the QUIC connection. The arrangement further comprises a static key providing module 912 configured to send the static key information to the server and the neighboring server. The example arrangement of FIG. 9b may, for example, be configured to perform method steps described in connection with FIG. 7.

The description of the example embodiments provided herein have been presented for purposes of illustration. The description is not intended to be exhaustive or to limit example embodiments to the precise form disclosed; modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible management server arrangements, corresponding methods, and computer program products. It should be appreciated that the example embodiments presented herein may be practiced in combination with each other.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in a host computer of a management server.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

Hence, it should be understood that the details of the described embodiments are merely examples brought forward for illustrative purposes, and that all variations that fall within the scope of the claims are intended to be embraced therein.

The invention claimed is:

1. A method of a server for controlling migration of a Quick User Datagram Protocol (UDP) Internet Connections (QUIC) connection between the server and a neighboring server, wherein the QUIC connection is identifiable by a connection identifier (CID) and is established to a migrating wireless device having a client IP-address, and wherein the server and the neighboring server comprise respective cache memories, are comprised in a content delivery network (CDN) and have a same server IP-address, the method comprising:
  receiving static key information representative of the QUIC connection;
  determining context transfer state information for the QUIC connection; and
  controlling transmission of a stateless reset packet for the QUIC connection based on the determined context transfer state information for the QUIC connection by providing the context transfer state information comprising a connection state and a tuple for the QUIC connection, which tuple comprises the CID, the client IP-address and the server IP-address, to a monitoring function of the neighboring server.

2. The method of claim 1, wherein the receiving of static key information comprises one of:
  receiving information on a default hash function to be used to generate a stateless reset token;
  receiving a stateless reset token generating function; or
  receiving program code of a hash function.

3. The method of claim 1, wherein the determining of context transfer state information further comprises:
  receiving the context transfer state information.

4. The method of claim 1, wherein the determining of context transfer state information further comprises:
  capturing, in a monitoring function of the server, one or more encrypted data packets transmitted between the client IP-address and the server IP-address;
  checking packet header of the captured one or more encrypted data packets; and
  determining the connection state and the tuple for the QUIC connection based on information from the packet header.

5. The method of claim 1, wherein the controlling further comprises:
  forwarding the stateless reset packet based on the determined context transfer state information for the QUIC connection.

6. The method of claim 1, wherein the controlling further comprises:
   generating a stateless reset token based on the received static key information;
   transmitting the stateless reset packet comprising the stateless reset token to the wireless device; and
   forwarding the stateless reset packet when the QUIC connection is in an active connection state.

7. The method of claim 1 further comprising:
   sending a request for static key information to a management server.

8. An apparatus for controlling migration of a Quick User Datagram Protocol (UDP) Internet Connections (QUIC) connection between a server and a neighboring server, wherein the QUIC connection is identifiable by a connection identifier (CID) and is established to a migrating wireless device having a client IP-address, and wherein the server and the neighboring server comprise respective cache memories, are comprised in a content delivery network (CDN) and have a same server IP-address, the apparatus comprising:
   processing circuitry; and
   a memory containing instructions which, when executed by the processing circuitry, cause the apparatus to:
      receive static key information representative of the QUIC connection;
      determine context transfer state information for the QUIC connection; and
      control transmission of a stateless reset token for the QUIC connection based on the determined context transfer state information for the QUIC connection by providing the context transfer state information comprising a connection state and a tuple for the QUIC connection, which tuple comprises the CID, the client IP-address and the server IP-address, to a monitoring function of the neighboring server.

9. A method of a management server for controlling migration of a Quick User Datagram Protocol (UDP) Internet Connections (QUIC) connection between a server and a neighboring server, wherein the QUIC connection is identifiable by a connection identifier (CID) and is established to a migrating wireless device having a client IP-address, wherein the server and the neighboring server comprise respective cache memories, are comprised in a content delivery network (CDN) and have a same server IP-address, and wherein the management server is configured to coordinate content delivery within the CDN, the method comprising:
   determining static key information applicable for all QUIC connections providing a same cached content;
   sending the static key information to the server and to the neighboring server for determining context transfer state information for the QUIC connection and controlling transmission of a stateless reset packet for the QUIC connection based on the determined context transfer state information for the QUIC connection by providing the context transfer state information comprising a connection state and a tuple for the QUIC connection, which tuple comprises the CID, the client IP-address and the server IP-address, to a monitoring function of the neighboring server to effect the migration from the server to the neighboring server.

10. The method of claim 9, further comprising:
    receiving a static key request from the server or the neighboring server.

11. An apparatus for controlling migration of a Quick User Datagram Protocol (UDP) Internet Connections (QUIC) connection between a server and a neighboring server, wherein the QUIC connection is identifiable by a connection identifier (CID) and is established to a migrating wireless device having a client IP-address, wherein the server and the neighboring server comprise respective cache memories, are comprised in a content delivery network (CDN) and have a same server IP-address, and wherein a management server is configured to coordinate content delivery within the CDN, the apparatus comprising:
    processing circuitry; and
    a memory containing instructions which, when executed by the processing circuitry, cause the apparatus to:
       determine static key information applicable for all QUIC connections providing a same cached content; and
       send the static key information to the server and to the neighboring server to determine context transfer state information for the QUIC connection and control transmission of a stateless reset packet for the QUIC connection based on the determined context transfer state information for the QUIC connection by providing the context transfer state information comprising a connection state and a tuple for the QUIC connection, which tuple comprises the CID, the client IP-address and the server IP-address, to a monitoring function of the neighboring server to effect the migration from the server to the neighboring server.

12. The apparatus of claim 11, wherein the apparatus is a host computer of a management server.

* * * * *